US011441206B2

(12) United States Patent
Gangoli et al.

(10) Patent No.: US 11,441,206 B2
(45) Date of Patent: Sep. 13, 2022

(54) SYSTEM AND METHOD OF OPERATING A BATCH MELTING FURNACE

(71) Applicant: Air Products and Chemicals, Inc., Allentown, PA (US)

(72) Inventors: Shailesh Pradeep Gangoli, Easton, PA (US); Avishek Guha, Breinigsville, PA (US); Anshu Gupta, Whitehall, PA (US); Reed Jacob Hendershot, Orefield, PA (US); Michael J. Gallagher, Coopersburg, PA (US); Martin Lawrence, Middlesex (GB); Petr Tlamicha, Dobrna (CZ)

(73) Assignee: Air Products and Chemicals, Inc., Allentown, PA (US)

( * ) Notice: Subject to any disclaimer, the term of this patent is extended or adjusted under 35 U.S.C. 154(b) by 1051 days.

(21) Appl. No.: 15/989,945

(22) Filed: May 25, 2018

(65) Prior Publication Data
US 2019/0360067 A1 Nov. 28, 2019

(51) Int. Cl.
*C03B 5/225* (2006.01)
*C22B 1/00* (2006.01)
(Continued)

(52) U.S. Cl.
CPC .............. *C22B 1/005* (2013.01); *C03B 3/026* (2013.01); *C03B 5/225* (2013.01); *C03C 1/002* (2013.01)

(58) Field of Classification Search
CPC ......... C03B 3/026; C03B 5/225; C03C 1/002; C22B 1/005; C22B 21/0092; C22B 7/003;
(Continued)

(56) References Cited

U.S. PATENT DOCUMENTS 3,514,280 A * 5/1970 Sherwood ............... C21C 5/567
75/527
4,484,947 A 11/1984 Marshall
(Continued)

FOREIGN PATENT DOCUMENTS

CN 102933728 2/2013
JP 08273826 A * 10/1996
(Continued)

OTHER PUBLICATIONS

NPL: on-line translation of JP 08273826 A, Oct. 1996 (Year: 1996).*
(Continued)

*Primary Examiner* — Jie Yang
(74) *Attorney, Agent, or Firm* — Larry S. Zelson (57) ABSTRACT

A system and method of controlling a metal melting process in a melting furnace, including determining at least one furnace parameter characterizing a melting furnace, adding a charge containing solid metal into the melting furnace, detecting at least one charge parameter characterizing the charge, firing a burner into the melting furnace to provide heat to melt the charge, and exhausting burner combustion products from the furnace, detecting at least one process parameter characterizing progress of melting the charge, calculating a furnace efficiency based on the at least one furnace parameter, calculating a predicted process pour readiness time based on the at least one charge parameter, the at least one process parameter, and the furnace efficiency, and controlling the metal melting process based on the predicted process pour readiness time.

6 Claims, 5 Drawing Sheets

(51) Int. Cl.
*C03B 3/02* (2006.01)
*C03C 1/00* (2006.01)

(58) Field of Classification Search
CPC .... F27B 3/28; F27D 19/00; F27D 2019/0003; F27D 21/0028; F27D 99/0033
USPC .......................................................... 75/401
See application file for complete search history.

(56) References Cited

U.S. PATENT DOCUMENTS

| | | | |
|---|---|---|---|
| 6,652,802 | B2 * | 11/2003 | Sherwood ............. C21B 13/085 266/176 |
| 2014/0305261 | A1 | 10/2014 | Lundh et al. | |

FOREIGN PATENT DOCUMENTS

| | | |
|---|---|---|
| JP | 3645306 | 5/2005 |
| TW | I609970 | 1/2018 |
| WO | 199523239 | 8/1995 |

OTHER PUBLICATIONS

Zhou Wang, et al, "A review of end-point carbon prediction for BOF steelmaking process", High Temperature Materials and Processes, vol. 39, No. 1, Dec. 28, 2020, pp. 653-662.

Rajat Bathla, "Carbon Prediction Model Using the Offgas Analysis at ArcelorMittal (Indiana Harbor No. 2 Steel Producing) BOF Shop With No Bottom Blowing and Suppressed Hood Combustion System", Nov. 30, 2011, pp. 1-9.

Coker, Eric N. "The oxidation of aluminum at high temperature studied by Thermogravimetric Analysis and Differential Scanning Calorimetry" Sandia Report SAND2013-8424 Oct. 2013.

J. Zhou, et al, "Multiple-response optimization for melting process of aluminum melting furnace based on response surface methodology with desirability function", J. Cent. South Univ., 2012, vol. 19, issue 10, pp. 2875-2885.

M. Brune, et al, "Optimization of Thermal Processes of Gas-Fired Melting for Secondary Aluminum", International Journal of Energy for a Clean Environment, 2005, vol. 6, issue 1, pp. 15-23.

E. Coker, "The oxidation of aluminum at high temperature studied by Thermogravimetric Analysis and Differential Scanning Calorimetry", Sandia Report SAND2013-8424, Sandia National Laboratories, Oct. 2013.

* cited by examiner

SYSTEM AND METHOD OF OPERATING A BATCH MELTING FURNACE

BACKGROUND

Secondary metals recycling processes involve melting of metal scrap from varied sources and upstream processes, such that the scrap often varies considerably in shape, size, and composition. This high degree of inconsistency in the input material must be accommodated in the melting process. Consequently, the energy needs of a melting furnace used in metals recycling change frequently, often from melt to melt, resulting in a high degree of variability in the operational efficiency and productivity. When operators are handling multiple furnaces at the same time, the penalties from process variability can be amplified.

Although statistical process/quality control (SPC) is used for control in various industries, SPC does not appear to have been used to determine process pour readiness times or to optimize between different parameters to achieve optimum melt times. In addition, while offline studies have examined optimization of aluminum melting using experiments and simulations, none appear to have developed methods to determine the time and energy required to complete the melting process expediently in real time or near real time without overheating the charge beyond that needed for metal transfer purposes.

U.S. Pat. No. 4,484,947 relates to control of an aluminum melting process in an enclosed hearth by measuring certain temperatures in the furnace and adjusting the firing rate of a burner to rapidly melt the aluminum without overheating of the charge. The process generally seeks to put a high level of heat into the furnace when the charge is solid and has a high heat capacity and then to put a lower level of heat into the furnace when the charge starts to become molten and has a lower capacity to absorb heat. The '947 patent does not predict process pour readiness time or use any sensors or measured parameters other than temperatures.

SUMMARY

Systems and methods for optimizing metals melting processes are described herein. A system of sensors and other data inputs is employed to monitor the characteristics of the solid metal charge, furnace operating efficiency, furnace process variables, and furnace output information. That information is used to better predict the process pour readiness time and/or the required tapping energy, to help improve process efficiencies, and/or to determine optimum operating conditions, taking into account trade-offs that include, but are not limited to, melting energy, melting time, firing rate, fuel/oxygen ratio, yield, multiple furnace operation, scrap availability and cost, and market needs.

Aspect 1. A system for controlling a metals melting process in a batch melting furnace comprising: a melting furnace comprising a chamber configured and arranged to receive a charge containing solid metal, a burner configured and arranged to provide heat of combustion to the charge in the chamber, and a passage to exhaust burner combustion products from the chamber, wherein the melting furnace is characterized by at least one furnace parameter; at least one sensor to detect at least one charge parameter characterizing a charge added to the furnace; at least one sensor to detect at least one process parameter characterizing progress of a melting process in the furnace; and a controller having a processor configured to: calculate an overall furnace efficiency based on the at least one furnace parameter; calculate a predicted process pour readiness time based on the at least one charge parameter, the at least one process parameter, and the overall efficiency; and control operation of the furnace based on the predicted process pour readiness time.

Aspect 2. The system of Aspect 1, further comprising: at least one sensor to detect at least one performance output parameter characterizing of the melting process; wherein the controller is further programmed to calculate the overall efficiency based on the at least one furnace parameter and the at least one output parameter.

Aspect 3. The system of Aspect 2, wherein the controller is further programmed to: record the at least one output parameter for multiple prior melting processes; and calculate the overall furnace efficiency based on the recorded at least one output parameter for multiple prior melting processes.

Aspect 4. The system of any one of Aspects 1 to 3, wherein the at least one charge parameter includes one or more of: charge weight, flux weight, flux composition, volatile contaminant content, expected yield, initial temperature, tapping temperature, pouring temperature, charge size, charge shape, charge surface-to-volume ratio, charge material composition, and charge melting temperature.

Aspect 5. The system of any one of Aspects 1 to 4, wherein the passage to exhaust burner combustion products includes a flue; and wherein the at least one process parameter includes one or more of: burner firing rate, reactant enthalpy rate, exhaust enthalpy rate, flue temperature, furnace wall temperature, fuel heating value, flue exit combustion intensity, baghouse temperature, flue gas composition, flue duct temperature, furnace door temperature, furnace door gap size, furnace shell temperature, furnace chamber temperature, charge melt rate, furnace heat loss, elapsed melt operation time, and charge visual appearance.

Aspect 6. The system of Aspect 5, wherein the furnace is a rotary furnace; and wherein the at least one process parameter further includes one or more of: furnace rotation speed, rotation motor current, rotation motor torque, and furnace vibration.

Aspect 7. The system of Aspect 5, wherein the furnace is a reverberatory furnace; and wherein the at least one process parameter further includes one or more of: gas pressure for bubbler gas stirring applications, roof temperature, wall temperature, floor temperature, speed of circulation of the melt, energy expended in circulation of the melt, and melt temperature inside the furnace chamber.

Aspect 8. The system of any one of Aspects 1 to 7, wherein the at least one furnace parameter includes one or more of: furnace type, furnace size, furnace condition, furnace age, refractory type, refractory age, scrap history, fuel cost, oxidizer cost, flux cost, and furnace operating procedures.

Aspect 9. The system of any one of Aspects 1 to 8, wherein the controller is further programmed to calculate the predicted process pour readiness time by: calculating a theoretical energy requirement based on the at least one charge parameter; calculating a target fuel consumption based on the theoretical energy requirement and the overall furnace efficiency; calculating an actual fuel consumption based on the at least one process parameter; and calculating the predicted process pour readiness time based on comparing the target fuel consumption with the actual fuel consumption.

Aspect 10. The system of any one of Aspects 1 to 8, wherein the controller is further programmed to calculate a tap time based on the process pour readiness prediction.

Aspect 11. A method of controlling a metal melting process in a melting furnace, comprising: determining at least one furnace parameter characterizing a melting furnace; adding a charge containing solid metal into the melting furnace; detecting at least one charge parameter characterizing the charge; firing a burner into the melting furnace to provide heat to melt the charge, and exhausting combustion products from the furnace through a flue; detecting at least one process parameter characterizing progress of melting the charge; calculating an overall furnace efficiency based on the at least one furnace parameter; calculating a predicted process pour readiness time based on the at least one charge parameter, the at least one process parameter, and the overall furnace efficiency; and controlling the metal melting process based on the predicted process pour readiness time.

Aspect 12. The method of Aspect 11, further comprising: detecting at least one output parameter characterizing output of the melting process; and calculating the overall furnace efficiency based on the at least one furnace parameter and the at least one output parameter.

Aspect 13. The method of Aspect 12, further comprising: recording the at least one output parameter for multiple prior melting processes; and calculating the overall furnace efficiency based on the recorded at least one output parameter for multiple prior melting processes.

Aspect 14. The method of any one of Aspects 11 to 13, wherein the at least one charge parameter includes one or more of: charge weight, flux weight, flux composition, volatile contaminant content, expected yield, initial temperature, charge size, charge shape, charge surface-to-volume ratio, charge material, and charge melting temperature.

Aspect 15. The method of any one of Aspects 11 to 14, wherein the at least one process parameter includes one or more of: burner firing rate, reactant enthalpy rate, exhaust enthalpy rate, flue temperature, furnace wall temperature, fuel heating value, flue exit combustion intensity, baghouse temperature, flue gas composition, flue duct temperature, furnace door temperature, furnace door gap size, furnace shell temperature, furnace chamber temperature, charge melt rate, furnace heat loss, elapsed melt operation time, and charge visual appearance.

Aspect 16. The method of Aspect 15, wherein the furnace is a rotary furnace; and wherein the at least one process parameter further includes one or more of: furnace rotation speed, rotation motor current, rotation motor torque, and furnace vibration.

Aspect 17. The method of Aspect 15, wherein the furnace is a reverb furnace; and wherein the at least one process parameter further includes one or more of: gas pressure for bubbler gas stirring applications, roof temperature, wall temperature, floor temperature, speed of circulation of the melt, energy expended in circulation of the melt, and melt temperature inside the furnace chamber.

Aspect 18. The method of any one of Aspects 11 to 17, wherein the at least one furnace parameter includes one or more of: furnace type, furnace size, furnace condition, furnace age, refractory type, refractory age, scrap history, fuel cost, oxidizer cost, flux cost, and furnace operating procedures.

Aspect 19. The method of any one of Aspects 11 to 18, further comprising: calculate the predicted process pour readiness time by: calculating a theoretical energy requirement based on the at least one charge parameter; calculating a target fuel consumption based on the theoretical energy requirement and the overall furnace efficiency; calculating an actual fuel consumption based on the at least one process parameter; and calculating the predicted process pour readiness time based on comparing the target fuel consumption with the actual fuel consumption.

Aspect 20. The method of any one of Aspects 11 to 18, further comprising calculating a tap time based on the process pour readiness prediction.

BRIEF DESCRIPTION OF THE DRAWINGS

The present invention will hereinafter be described in conjunction with the appended figures wherein like numerals denote like elements.

DETAILED DESCRIPTION

Metals melting, particularly of metal scrap, is a complex problem with many variables. Typically, the main sources of mass input into the furnace are from a burner and material charged. Some furnaces have additional lances, porous plugs, or other similar technology for introducing reactant gases or other materials, required for the process. There can also be some air ingress through gaps in the furnace. Mass input from the burner can be in the form of solid, liquid, and/or gaseous fuel, accompanied by an oxidizer, which is normally air and/or enriched air, where enriched air can include greater than 20.9% oxygen up to 100% oxygen. Material charged into the furnace normally consists of a metal or metal alloy, metal oxides, metal impurities, organic material, additives, and some sort of flux or salt. Sometimes additives or flux do not need to be added, depending on the process and composition of the charge material.

Material output from the furnace mainly occurs through the flue (or another passage for exhausting combustion products, such as a gap between the furnace and door) and from removal of processed charge material (which may include molten metal refined from metal ore, as well as remaining solids from the metal ore such as dross or slag)—pouring/tapping and slagging. Flue gas composition and volumes are dependent on charge material composition, combustion stoichiometry and burner flow rates. Liquid metal is normally poured or tapped out of the furnace and cast into sows or ingot, or into a launder to be transferred into another furnace. After pouring, the remaining waste material, often referred to as slag, is removed from the furnace. Slag often contains a percentage of the final product and therefore, it is often reprocessed to extract as much of the final product as possible. Any material remaining in the furnace is called a heel and becomes part of the next batch.

The systems and methods described herein completes a mass and energy balance by combining theoretical calculations with data from measuring key parameters, such as charge material type and weight, flow rates of input gases and flue gas temperatures. This analysis is then used to determine the performance of the process, including but not limited to furnace efficiency, available heat, and furnace losses. A relatively large data set, combined with expert knowledge and near live field data is then used to determine the ideal or target operation of the furnace at a given time for a given charge material. The ideal or target operation is then used to determine whether and when sufficient energy has been input into the furnace to melt the charge material to the desired condition, based on a number of data inputs, providing near-live feedback to the furnace operator. Alternatively, the system can be configured to operate automatically in a closed-loop control mode without the necessity of an operator to make decisions.

Figure 3:
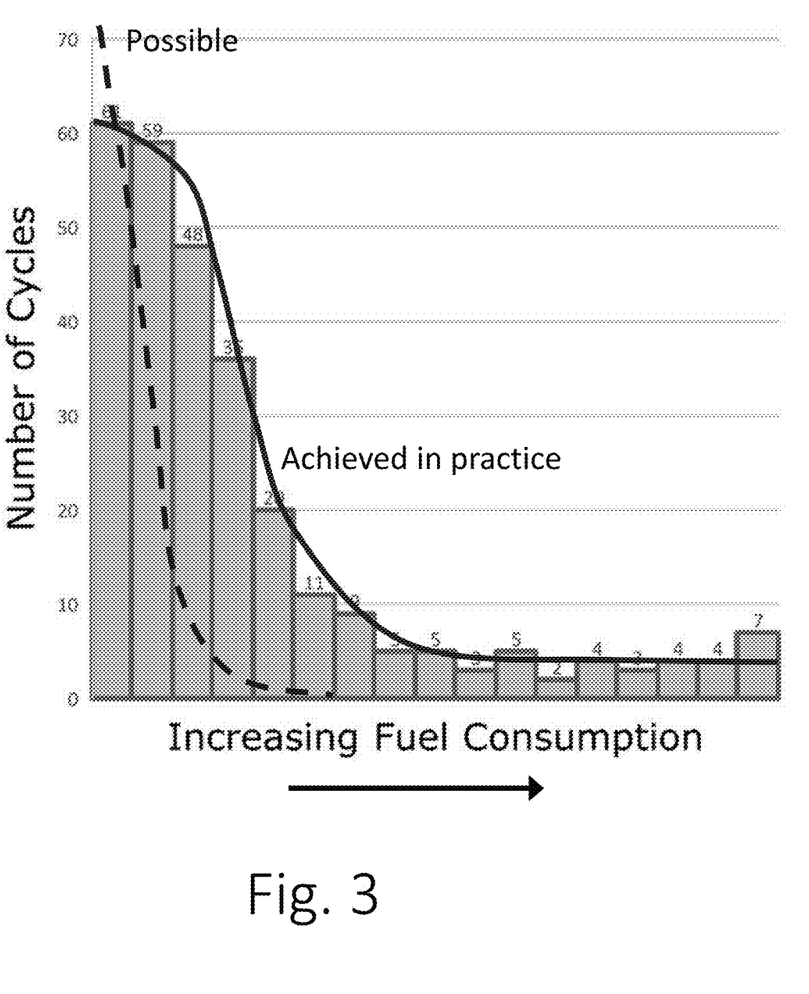
FIG. 3 is a graphical comparison of an actual heat input to a minimum potential heat input necessary to melt an aluminum charge, per unit weight.

The specific energy required for melting aluminum scrap is shown in FIG. 3, comparing an example of actual specific fuel consumption (SFC) achieved in a typical aluminum rotary furnace not using the methods described herein to a more optimized fuel consumption. FIG. 3 shows that in present practice, the energy required for melting follows a distribution with an average of about 850 Btu/lb, while a target SFC could be as low as about 725 Btu/lb, which can be obtained with the presently disclosed methods. Thus, a possible 15% reduction in energy efficiency can be achieved by improved process control.

Figure 4:
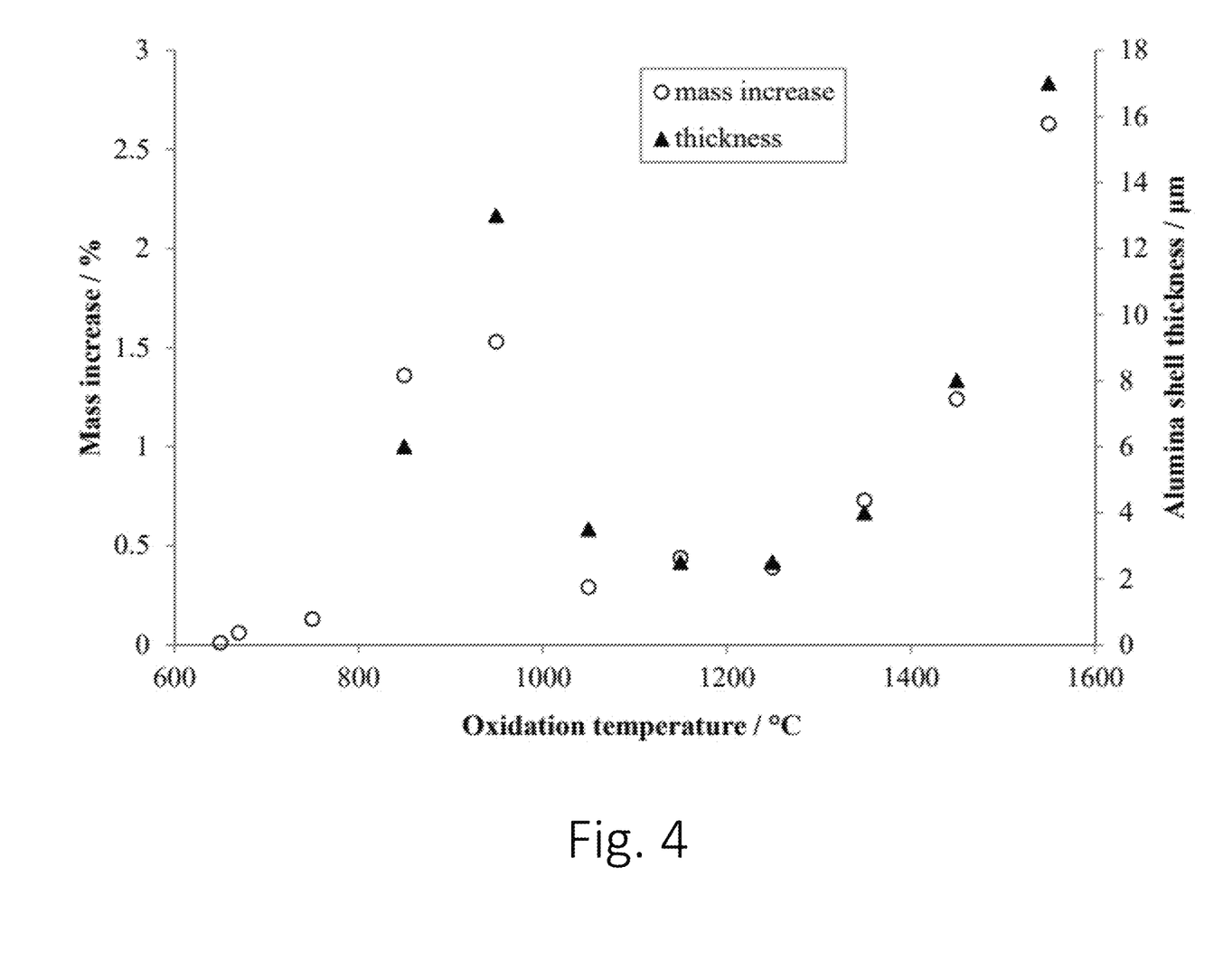
FIG. 4 is a prior art graph showing the variation of alumina (aluminum oxide) formation with temperature, indicating the increase in potential yield loss as aluminum temperature increases beyond that needed for processing.

In addition to energy savings per unit charge weight, preventing over- or under-heating of the charge material can have significant benefits. For example, FIG. 4 (from Sandia Report SAND2013-8424 by Eric N. Coker entitled "The oxidation of aluminum at high temperature by Thermogravimetric Analysis and Differential Scanning calorimetry") demonstrates one of the potential problems with overheating aluminum. Loss in product or yield increases as the aluminum becomes oxidized at higher temperatures. Aluminum melts at 660° C. From about 750° C. to 800° C., the oxidation rate is modest compared with the oxidation rate above 800° C. Therefore, by keeping the molten temperature only as high as needed for processing, and preferably below 800° C., energy input (fuel and oxygen) and aluminum can all be conserved. In addition, cycle times can be shortened, saving time, reducing operating costs, and enabling increased production.

The systems and methods described herein seek to optimize a metals melting process by: (1) identifying the materials charged in the furnace, (2) quantifying the total energy required to (heat and) melt the material (noting that some fraction of the material, in the form of dross or slag, will not be melted), (3) using of a system of sensors to track energy inputs and losses in an operation, (4) accounting for factors that affect furnace efficiency, and (5) combining the information from two or more of the foregoing to determine an estimate of the target tapping energy and optimal tapping time. This strategy is driven by experience-based calculations, and continual refinement based on prior melting processes in the same (and optionally similar) furnaces, of the overall efficiency of the melting furnace.

Figure 1:
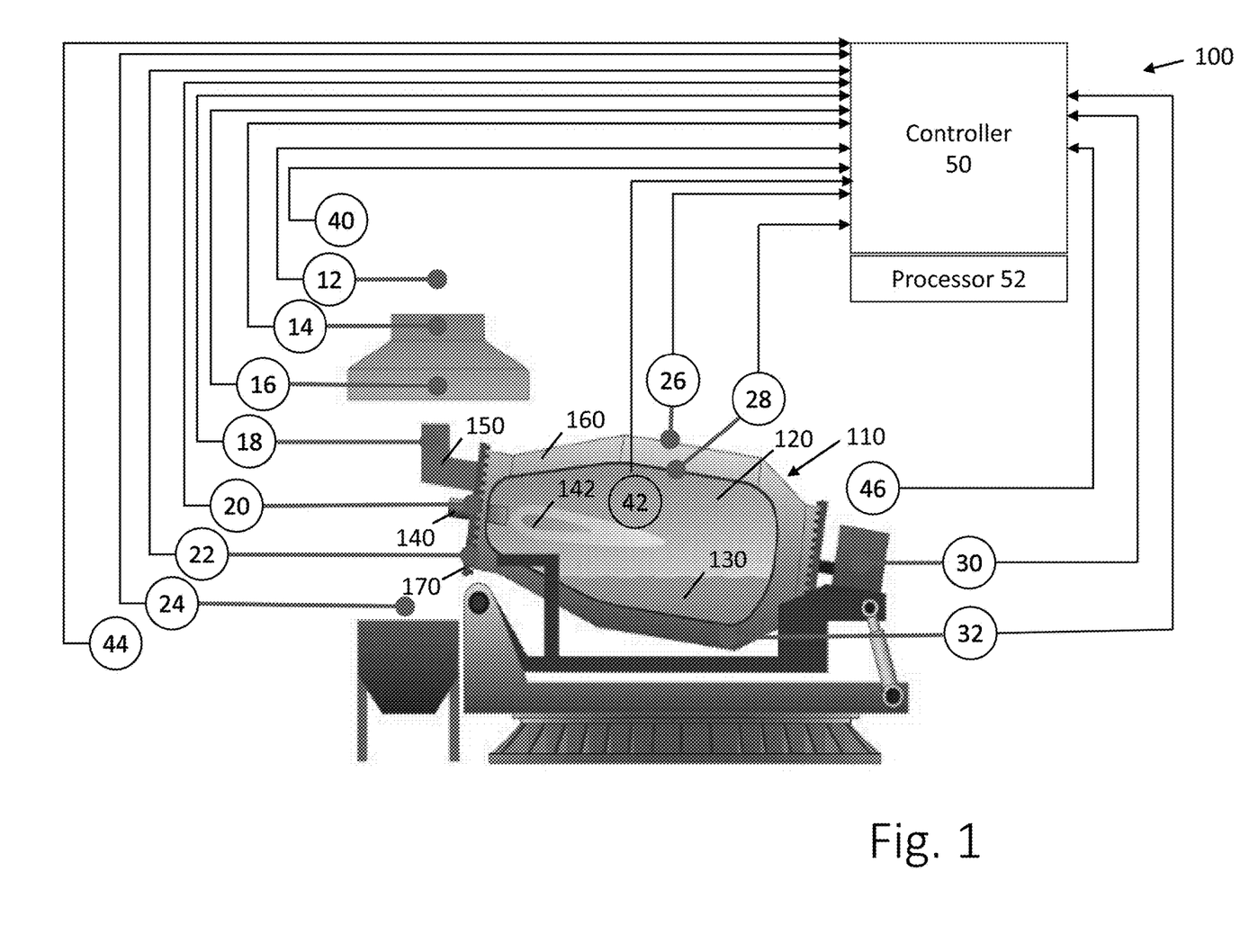
FIG. 1 is a partial sectional schematic side view of an exemplary rotary furnace with an non-exhaustive illustration of possible sensor locations and types that can be used in a batch metals melting control system and process as described herein.
Figure 2:
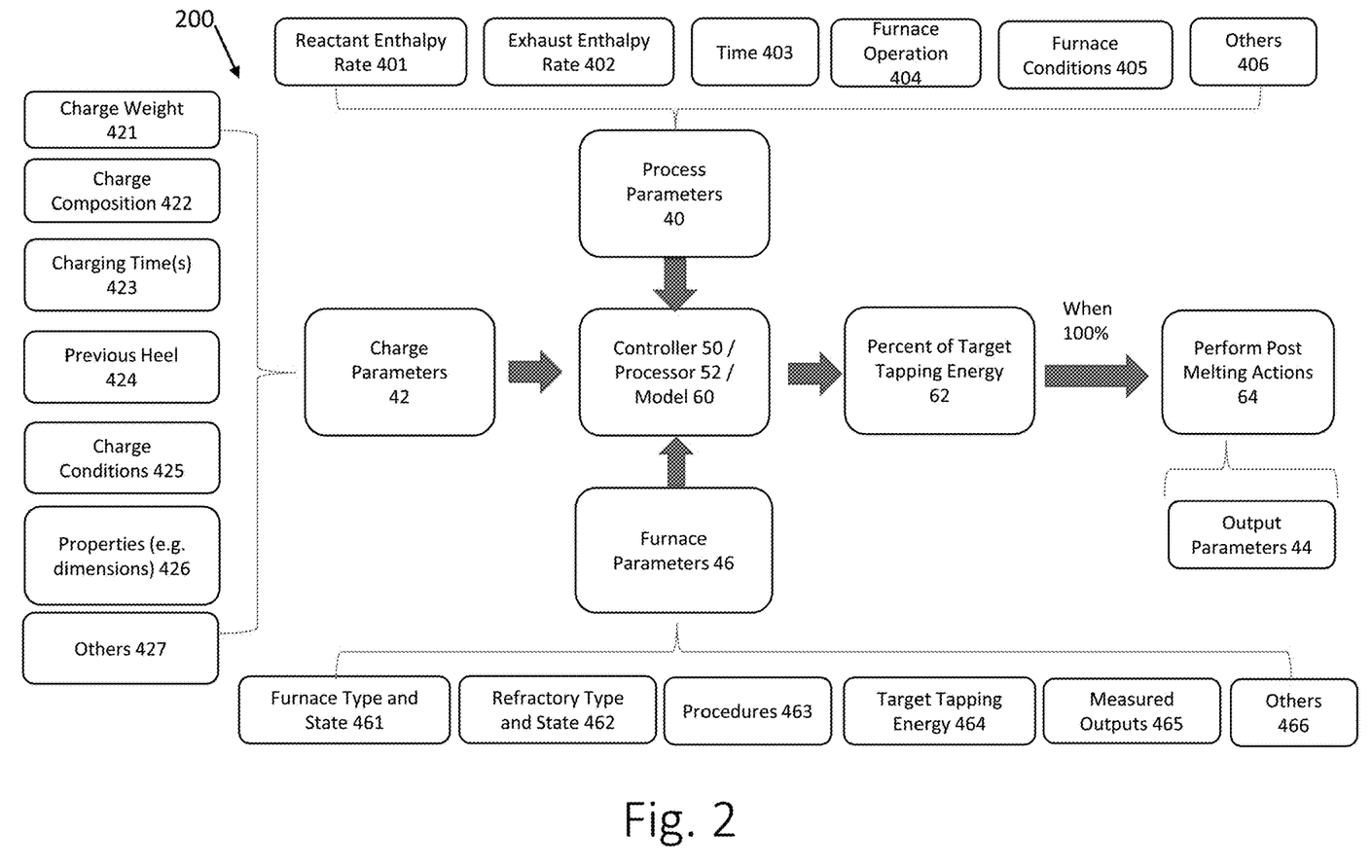
FIG. 2 is a simplified flow diagram of a batch metals melting control process.

An exemplary system 100 is shown in FIG. 1 for implementing an exemplary control process 200 as shown in FIG. 2. The system of FIG. 1 is implemented for a rotary furnace 110 fitted with various sensors and is characterized by additional inputs, as described below. The system 100 includes the furnace 110, a furnace wall 160, a chamber 120 bounded by the furnace wall 160 to contain a charge 130, a burner 140 to provide combustion energy into the chamber 120 and the charge 130 by a flame 142, and a flue 150 for exhausting combustion products from the chamber 120. A door 170 covers an open end of the furnace 110. It is understood that some furnaces do not include a flue but instead exhaust combustion products through another passage, such as cracks or a gap between the furnace and the door.

The furnace 110 and related equipment are outfitted with various sensors. As non-limiting examples, these sensors may include charge input sensors 42, such as a charge weight sensor 32. These sensors may further include process parameter sensors 40, such as a baghouse temperature sensor 12, a flue duct temperature sensor 14, a combustion intensity or flue gas composition sensor 16, a flue gas temperature sensor 18, a door temperature sensor 20, a door gap sensor 22, a shell temperature sensor 26, and a furnace refractory or wall temperature sensor 28. The sensors may still further include equipment sensors 46, such as a rotational speed sensor 30. The sensors may still further include output sensors 44, such as a metal pour temperature sensor 24. All of these sensor inputs, as well as additional data or information which may be manually or automatically input, are provided to a controller 50 having a processor 52.

As shown in FIG. 2, charge inputs 42 to the controller 50 include information provided by sensors, such as charge weight 421, as well as other information that is obtained manually or automatically, such as charge composition 422, charging time 423, previous heel 424 (how much of the previous melted charge remained in the furnace 110 after tapping), charge conditions 425 (e.g., whether the charge contains oils, paints, or other volatile components), charge properties 426 (e.g., size, shape, surface-to-volume ratio), and other data 427 (e.g., amount of flux or salt in the charge, initial charge temperature, charge melting temperature, flux or salt composition).

Additionally, process inputs 40 to the controller 50 include information provided by sensors, as well as other information that is obtained manually or automatically, such as reactant enthalpy rate 401 (e.g., burner firing rate), exhaust enthalpy rate 402 (which may be determined based in part on exhaust temperature and composition), time 403, furnace operation 404, furnace conditions 405, and other data 406 (e.g., expected recovery or metal yield, fuel flow rate, oxidant flow rate, exhaust flow rate, burner stoichiometry).

Still further, furnace inputs 46 to the controller 50 include information provided by sensors, as well as other information that is obtained manually or automatically, such as furnace type and state 461, refractory type and state 462, procedures 463, target tapping energy 464, measured outputs 465, and other data 466. Some furnace inputs may also capture historical or equipment-related data.

The charge parameter inputs can be provided either automatically or via inputs from an operator into an HMI or other means. In one example, the expected recovery input can be received by selection of a charge type either manually or by image recognition, wherein the image recognition can calculate a pre-determined expected recovery for a given charge type or can be trained to identify expected recovery based on optical properties of the charge in using visible and/or non-visible wavelengths. Using such technology, pictures or images of the metal charge can help identify the charge and determine type, quality, and surface area to volume ratio, as well as overall charge size. Similar techniques can be used with regard to volatile contaminants. Weights can be measured using traditional load cells, other traditional means, or estimated with image recognition.

The controller 50 receives all of these inputs, and the processor 52 uses a model 60 to calculate a target tapping energy prediction and to determine how far along the process is relative to the target tapping energy prediction.

In the simplified process flow diagram for an exemplary batch metals melting control process shown in FIG. 2, theoretical calculations, combined with real data, are used to create the model 60 of the furnace. As described above, the accuracy of the model 60 depends on various inputs, relating to equipment, charge material, and process parameters.

The primary control objective of the model 60 is to accurately predict the required tapping energy 62 and then to provide live feedback to the furnace operator in real time or near real time for open loop control or automatically in closed loop control, conveying the percentage of target tapping energy that has been reached. By accurately predicting the target tapping energy 62, and the furnace controls can be adjusted to optimize the approach to the predicted target tapping energy 62 without overheating the melt. When 100% is reached (i.e., when the model 60 calculates that the target tapping energy 62 has been input into the charge), the operator is alerted of the prediction that sufficient energy has been input into the furnace to achieve the desired tapping temperature, for that particular cycle. This tells the operator that the melting phase of the cycle is complete, The operator or system should then turn off the burner and perform post melting actions to complete the cycle.

After melting, post melting actions 64 are performed. These may include manually stirring the melt and taking a sample of the molten metal for analysis, and measuring any relevant output parameters 44 that may be used to inform the operation of subsequent melting processes in the furnace. This is followed by molten metal tapping (pouring) either into another furnace, into sows, or cast into final product. Finally, the slag is removed from the furnace.

Presently, a number of key input parameters are estimated by experienced furnace operators, as well as whether or not the charge is sufficiently melted before tapping. However, as with all estimates by people, the variability in estimates between people and at different times is quite large—the human factor can be quite significant in affecting results. In practice, furnace performance variations can be seen from operator-to-operator and shift-to-shift. Furthermore, manual data input, such as charge weight into the furnace, can be entered incorrectly. Advanced tools in image processing and analytics can overcome both challenges. By developing an initial data set of images before processing with estimated recovery, critical charge sizes, and volatile component fraction, the system can be trained to automatically provide estimates of these values before melting, and those values can be used in calculating estimated melting energy requirements and hence, required tapping energy. Then when the targeted tapping energy is met, the system learns if the estimate was accurate, based on at least one output parameter measured after melting.

For example, the performance of the target tapping energy predictor algorithm can be determined by evaluating the difference between the metal pour temperature and the predicted metal pour temperature, and/or by evaluating the difference between the actual flue exit flame or combustion intensity vs predicted intensity. The difference between these values (predicted and actual) is understood to be based on the charge parameters or details and other measured variables and furnace parameters. The results of this comparison can be used to continually update and improve the overall efficiency calculation for the furnace, such that, with time and the experience of many melt operations, the required tapping energy predictor is continually improved.

In one embodiment, the target tapping energy was identified for the remelting process of aluminum scrap in a tilt rotary furnace. The target tapping energy was then used to calculate the required tapping energy for future melts carried out for that particular furnace, based on the equations described below.

Equation 1 was used to calculate the required tapping energy $Q_{Tap}$ of the charge material $$Q_{Tap} = (Q_{Melt} + Q_L + Q_{Heat})_{Al} Y + Q_{Heat,Al_2O_3}(1-Y) + (Q_{Melt} + Q_L + Q_{Heat})_{Salt},\quad (1)$$

where Y is the percentage aluminium content in the charge material, Q is energy and the subscripts Melt, L and Heat refer to melting, latent and heating. Equation 2 calculates energy required to bring the material to melting temperature $$Q_{Melt} = mCP(T_{Melt} - T_0),\quad (2)$$

where m is the mass of the material, Cp is the specific heat capacity of the material, $T_{Melt}$ is the melting point of the material and $T_0$ is the starting (typically ambient) temperature. Equation 3 is the latent energy required to completely melt the material $$Q_L = mL,\quad (3)$$

where L is the latent energy for melting for the material. Equation 4 is the energy required to heat the material to tapping temperature $$Q_{Heat} = mCp_{Melt}(T_{Tap} - T_{Melt}),\quad (4)$$

where $Cp_{Melt}$ is the Cp value for the liquid and $T_{Tap}$ is the tapping temperature. Similar equations can be put together by those skilled in the art for $Al_2O_3$ and Salt.

Equation 1 takes into account the varying composition of charge material.

Aluminium remelting charge material mainly consists of aluminium and aluminium oxide. For example, dross material can contain lower than 20% aluminium and up to more than 80%, depending on the dross source and upstream process. An estimate of expected yield for each type of material is the starting point for an iteration process, whereby the calculation feeds back new data to improve itself over time, as more data is collected.

Equation 5 relates a number of important output parameters $$Q_{in} = Q_{Tap} + Q_{flue} + Q_{Other},\quad (5)$$

where $Q_{in}$ is the energy input during a cycle, $Q_{flue}$ is the energy lost in the flue and $Q_{Other}$ accounts for all other furnace/process losses or gains.

The energy lost in the flue can be calculated using various methods well known in the art. For example, the composition, temperature, and mass flow of the flue gas could be measured and from that the flue enthalpy could be calculated. Alternatively the composition and mass flow of the flue gas could be estimated based on fuel and oxidant inputs and composition or other means, and the temperature could be measured. Then by combining the estimates and the measurements, a flue gas enthalpy could be estimated.

$Q_{Other}$ can also be determined by various means. For example, a regression analysis on historical data can be used to estimate $Q_{other}$ when the other parameters in equation 5 are known and an equation fit to the data as a function of various parameters such as charge composition, charge mass, furnace type and age and other parameters. Alternatively $Q_{Other}$ could be further expanded to include known losses such as furnace shell losses, furnace shell absorption, furnace gap losses (e.g. leaks), radiation and mass losses when charging ports are open, aluminum oxidation gains, combustible gains from the charge material, and any other losses or gains in addition to unknown losses or gains. Each one of the known losses or gains could be estimated using measured values and historical information and then input into equation 5.

Once the $Q_{Other}$ can be estimated, it could also be used to estimate aluminum oxidation losses by comparing $Q_{Other}$ with an ideal $Q_{Other}$ based on historical correlations and attributing the difference to changes in aluminum oxidation.

With values determined for $Q_{flue}$, and $Q_{Other}$, and a known $Q_{tap}$, the required $Q_{in}$ can be estimated and used to determine the time required for the charge to reach the target tapping energy.

Various process parameters can be used to control the melt process in the furnace and to determine the target tapping energy time. When using $Q_{in}$ as a process parameter, once the $Q_{in}$ is estimated, energy input to the furnace continues until the actual fuel consumption matches the $Q_{in}$ setpoint.

Any one or more of several other process parameters or measurements in the furnace can be used to improve the certainty of target tapping energy time predictions and the computed energy balance in determining the $Q_{in}$. These process parameters include, but are not limited to, baghouse temperature, flue gas composition (e.g., using sensors such as GC/MS/IR), duct temperature, flue exit flame intensity, flue temperature, door temperature, door gap size, channel transfer temperature, shell temperature (potentially measured in multiple locations), inside surface temperature (potentially measured in multiple locations), rotational speed, motor current or torque, and furnace vibration. For example, numerous of such sensors, locations, and type of measurements are indicated in FIG. 1 for a rotary furnace.

The calculated overall furnace efficiency is not a constant, but instead is a function of various furnace parameters, including but not limited to furnace type (e.g., rotary or reverb), furnace size, refractory condition (including wear and tear and age), refractory type and thickness, ambient conditions, scrap history, refractory heat absorption, furnace operating procedures, metal charge properties (e.g., size of charge components and subsequently the ability to absorb energy), as well as other factors.

Any one or more output parameter can be measured to determine the output of the furnace melting process, such as final temperature, yield, or total process time. If the actual temperature of the melt is known (and compared against the desired final melt temperature), it can be used to iteratively improve the estimate for overall furnace efficiency and therefore improve future control outcomes. Various mechanisms for measuring pour temperature or a proxy for pour temperature have been demonstrated. One method is to use a pyrometer to optically measure the temperature of the pour itself. Another method is to use thermocouples or other direct contact measurement devices. The thermocouple (or other device) can be either directly in the melt or in a wall through which the melt passes when discharged from the furnace. It is important that the temperature measured is consistent in determining the pour temperature and accurately correlates to the actual pour temperature, either through reaching the same value for the same pour temperature or having a known correlation with time, even if the absolute measured value differs from the actual pour temperature. Improvements to the overall furnace efficiency calculation can also take into account the amount of any charge remaining in the furnace after tapping using load cells for example.

Additionally, by leveraging models across multiple rotary furnaces the correlations between measured parameters (including image analysis for possible recovery ratio) and melt time (or required tapping energy) can be better generalized and improved more rapidly than installing instrumentation and using a model for a single rotary furnace. These learnings can even be extended beyond a single type of furnace and a single metal, since similar tools can be used for reverb and other furnaces and for other metals such as copper and lead. Again, by generalizing the learnings using multiple types of furnaces and metals, the models will become more robust and predictive. The model can even be extended to optimize the integration of multiple furnaces at a single site to maximize site profitability and could include items such as fuel cost, oxidizer cost, flux cost, and furnace efficiency.

For reverb furnaces, other parameters not mentioned above can have importance. These include gas pressure for bubbler gas stirring applications (e.g., higher back pressure indicates higher liquid level in furnace or change in back pressure over a single melt cycle indicates clogging over time), roof, wall, and floor temperatures inside and outside of the furnace at multiple locations, speed of circulation of the melt using a mechanical or electromagnetic device, energy expended in the circulation of the molten metal and direct metal temperature measurement inside the furnace.

These variables serve as effective inputs into the development of process control strategies. Analogous to the methods proposed above, dependencies of all the above variables on the calculation of energy losses may be iteratively adjusted and improved by minimizing the difference between measured final metal temperature to the desired metal temperature at the end of the process to yield more consistent prediction of the target tapping energy time.

In addition, the model can also be used to determine the optimum time to perform maintenance by analyzing the furnace efficiency and other variables. This will help determine when to perform refractory repairs and change-outs and even when to add capital, such as increasing furnace size or to add afterburners or other means for heat recovery. As an example, an analysis was done of the time required to complete a melting cycle in an aluminum rotary furnace both before and after the furnace was relined with refractory. The distribution of the cycle time, before and after the reline, showed a reduction in the required heating time. Using the furnace model, a decision on when to reline the furnace refractory can be made to maximize the economic impact of the reline.

The control method can run in open loop and/or closed loop control. In addition, it may be desirable to have some control loops in open-loop control mode while others are in closed-loop control mode. For example, flow controls can be in closed loop control mode while recommendations on salt input or refractory change-out can be in open loop control mode.

Example data and furnace calculations.

Data was collected on a rotary aluminum melting furnace similar to that shown schematically in FIG. 1 to demonstrate the control system and methods described herein. The data collected included: natural gas and oxygen flow rates, flue gas temperature, and furnace shell temperature.

Figure 5:
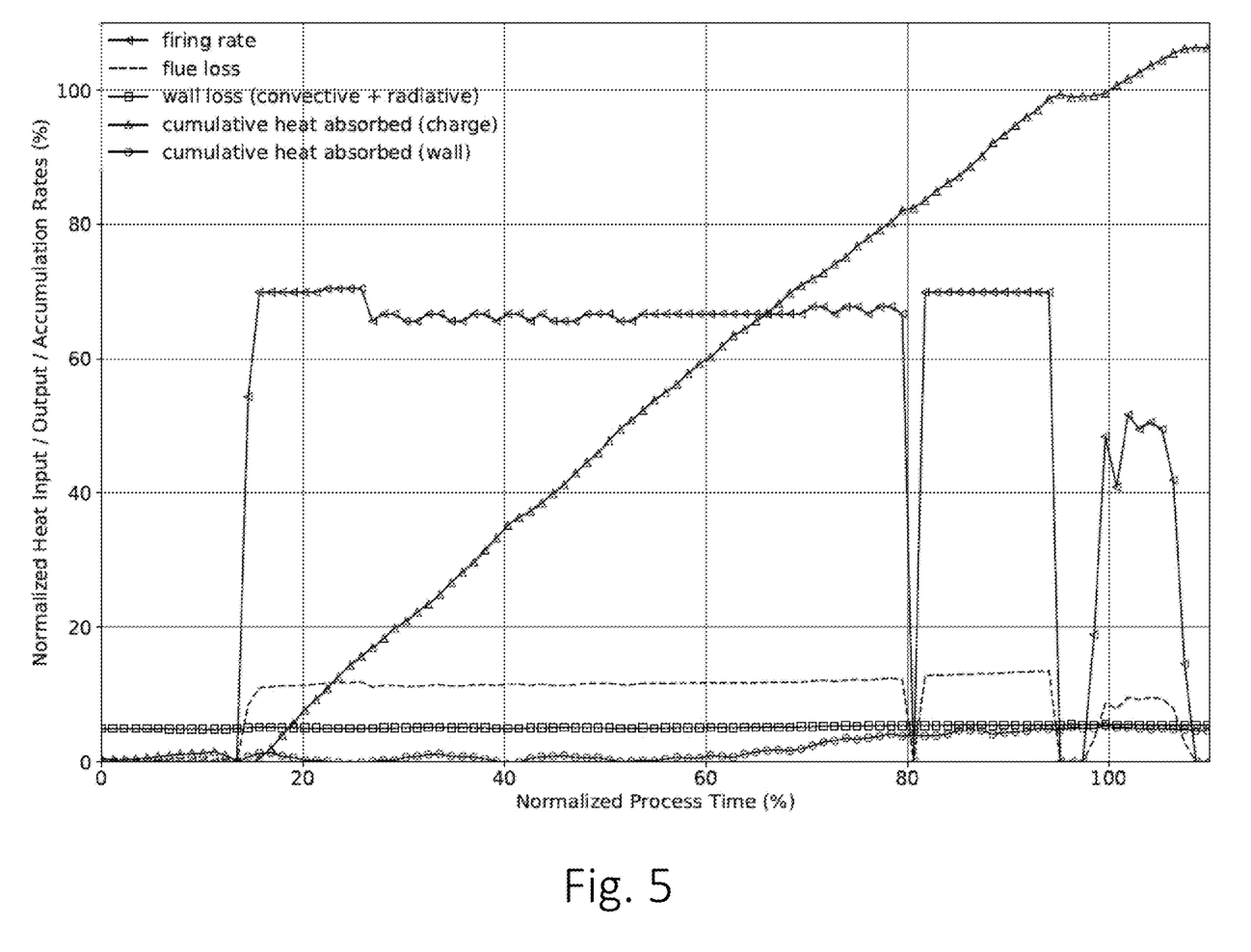
FIG. 5 is a graphical display of actual and calculated data generated during testing of an embodiment of a batch metals melting control process in melting an aluminum charge.

FIG. 5 shows data from an exemplary cycle, from charging, through to the end of the melting phase, where the data points are time averaged for visualization purposes. The x-axis shows time, normalized and conveyed in percentage of time since charging begins. The y-axis shows heat input/output/accumulation rates in percentage. Beginning at 0% time, charging commences and continues until about 14% time. At this point the burner is started, shown by the firing rate curve increasing from 0 to about 70%. At approximately 26% time, the burner firing rate is reduced slightly to about 65%, where it is kept relatively constant until about 80% time. During this time the cumulative heat absorbed into the charge can be seen to continuously increase, as expected. The cumulative heat absorbed by the furnace wall does not begin to increase significantly until after about 60% time. Wall convective and radiative losses remain fairly constant throughout and flue losses can be seen to increase slightly toward the end of the melting phase.

The operator stopped the burner at 80% time in order to look inside the furnace and to gauge how complete the melting phase was. The burner was restarted shortly after and left running until about 95% time. At this point the operator stirred the melt and then relit the burner for about another 10% time. The target tapping energy was considered reached after the burner was turned off and post melting actions were then performed.

The model prediction for the tapping energy required for completely melting the charge is shown in the figure by the 100% value on the y-axis. The corresponding time is shown by the 100% value on the x-axis. The model prediction shows that when the burner was turned off for the second time, prior to stirring, the target tapping energy was almost reached, where the cumulative heat absorbed by the charge was at about 98%. The model prediction shows that if the operator had left the burner running slightly longer, then the melt would have been completed by approximately 96% time. Furthermore, the burner would not have been relit for another 10% time. The figure shows that with the model in place, melting time could have been reduced by approximately 14%. Moreover, about 5-6% heat input could have been reduced, saving energy and preventing overheating of the metal and thus reducing the potential for aluminum oxidation.

Although the present disclosure and examples relate to metals melting, it is understood that the same or similar techniques can be applied to smelting operations (such as lead smelting). In particular, in a smelting operation, a combination of at least one charge parameter, at least one furnace parameter, and at least one process parameter can be used to characterize operation of the smelter and optimize the energy input and time required to complete the smelting operation as described herein.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A method of controlling a batch metal melting process in a melting furnace, comprising:
    determining at least one furnace parameter characterizing a melting furnace;
    adding a charge containing solid metal into the melting furnace;
    detecting at least one charge parameter characterizing the charge;
    firing a burner into the melting furnace to provide heat to melt the charge, and exhausting combustion products from the furnace through a passage;
    detecting at least one process parameter characterizing progress of melting the charge;
    calculating a furnace efficiency based on the at least one furnace parameter;
    calculating a predicted process pour readiness time based on the at least one charge parameter, the at least one process parameter, and the furnace efficiency by:
    calculating a theoretical energy requirement based on the at least one charge parameter;
    calculating a target fuel consumption based on the theoretical energy requirement and the overall furnace efficiency;
    calculating an actual fuel consumption based on the at least one process parameter; and
    calculating the predicted process pour readiness time based on comparing the target fuel consumption with the actual fuel consumption; and
    controlling the metal melting process based on the predicted process pour readiness time;
    wherein the passage to exhaust burner combustion products includes a flue; and
    wherein the at least one process parameter includes one or more of: burner firing rate, reactant enthalpy rate, exhaust enthalpy rate, flue temperature, furnace wall temperature, fuel heating value, flue exit combustion intensity, baghouse temperature, flue gas composition, flue duct temperature, furnace door temperature, furnace door gap size, furnace shell temperature, furnace chamber temperature, charge melt rate, furnace heat loss, elapsed melt operation time, and charge visual appearance.

2. The method of claim 1, further comprising:
    detecting at least one output parameter characterizing output of the melting process; and
    calculating the overall furnace efficiency based on the at least one furnace parameter and the at least one output parameter.

3. The method of claim 2, further comprising:
    recording the at least one output parameter for multiple prior melting processes; and
    calculating the overall furnace efficiency based on the recorded at least one output parameter for multiple prior melting processes.

4. The method of claim 1, wherein the at least one charge parameter includes one or more of: charge weight, flux weight, flux composition, volatile contaminant content, expected yield, initial temperature, tapping temperature, pouring temperature, charge size, charge shape, charge surface-to-volume ratio, charge material composition, and charge melting temperature.

5. The method of claim 1,
    wherein when the furnace is a rotary furnace, the at least one process parameter further includes one or more of: furnace rotation speed, rotation motor current, rotation motor torque, and furnace vibration; and
    wherein the furnace is a reverberatory furnace, the at least one process parameter further includes one or more of: gas pressure for bubbler gas stirring applications, roof temperature, wall temperature, floor temperature, speed of circulation of the melt, energy expended in circulation of the melt, and melt temperature inside the furnace chamber.

6. The method of claim 1, wherein the at least one furnace parameter includes one or more of: furnace type, furnace size, furnace condition, furnace age, refractory type, refractory age, scrap history, fuel cost, oxidizer cost, flux cost, and furnace operating procedures.

* * * * *